(12) United States Patent
Hedtke

(10) Patent No.: US 9,086,167 B2
(45) Date of Patent: Jul. 21, 2015

(54) PRESSURE ISOLATION MANIFOLD

(71) Applicant: Rosemount Inc., Chanhassen, MN (US)

(72) Inventor: Robert C. Hedtke, Young America, MN (US)

(73) Assignee: Rosemount Inc., Chanhassen, MN (US)

( * ) Notice: Subject to any disclaimer, the term of this patent is extended or adjusted under 35 U.S.C. 154(b) by 115 days.

(21) Appl. No.: 14/037,856

(22) Filed: Sep. 26, 2013

(65) Prior Publication Data
US 2015/0083245 A1 Mar. 26, 2015

(51) Int. Cl.
F16K 17/168 (2006.01)
F16K 37/00 (2006.01)
F16K 17/19 (2006.01)
G01L 19/06 (2006.01)

(52) U.S. Cl.
CPC ............ F16K 37/005 (2013.01); F16K 17/168 (2013.01); F16K 17/19 (2013.01); G01L 19/0618 (2013.01)

(58) Field of Classification Search
CPC ............ G01L 19/0609; G01L 19/0618; F16K 17/168
USPC .......................... 137/557, 861, 877, 878, 881
See application file for complete search history.

(56) References Cited

U.S. PATENT DOCUMENTS

| 3,145,733 | A | * | 8/1964 | Shaw et al. | 137/583 |
| 4,120,206 | A | | 10/1978 | Rud, Jr. | |
| 4,120,319 | A | * | 10/1978 | Krechel et al. | 137/583 |
| 4,570,677 | A | * | 2/1986 | Roxton et al. | 137/881 |
| 4,616,677 | A | * | 10/1986 | Krechel et al. | 137/881 |
| 4,644,972 | A | * | 2/1987 | Perrott | 137/883 |
| 6,050,145 | A | | 4/2000 | Olson et al. | |
| 6,105,437 | A | | 8/2000 | Klug et al. | |
| 6,279,401 | B1 | * | 8/2001 | Karas | 73/716 |
| 7,231,831 | B1 | | 6/2007 | Lancaster | |

(Continued)

FOREIGN PATENT DOCUMENTS

EP 2242943 B1 1/2012

OTHER PUBLICATIONS

Data Sheet, Pressure transmitters with integrated pulse-snubber Type MBS 4050, Danfoss, Aug. 1997.

(Continued)

Primary Examiner — John Fox
(74) Attorney, Agent, or Firm — Kinney & Lange, P.A.

(57) ABSTRACT

An isolation manifold includes a manifold body, a process connection at a first end of the manifold body, a pressure transmitter connection at a second end of the manifold body, a passageway through the manifold body, an isolation valve, and a pressure limiting device. The process connection is for fluidly connecting the isolation manifold to a process vessel or conduit containing a process fluid. The pressure transmitter connection is for fluidly connecting the isolation manifold to a pressure transmitter. The passageway fluidly connects the process connection to the pressure transmitter connection. The isolation valve is operable to selectively block the passageway to isolate the process connection from the pressure transmitter connection. The pressure limiting device fluidly connects to the passageway between the isolation valve and the pressure transmitter connection. The manifold may preferably include a pressure snubber within the passageway to increase the flow impedance of the passageway.

20 Claims, 3 Drawing Sheets

(56) References Cited

U.S. PATENT DOCUMENTS

2002/0178822 A1    12/2002    Nelson et al.
2011/0290337 A1    12/2011    Pozzati

OTHER PUBLICATIONS

Primary Isolation Valves, Anderson Greenwood Instrumentation Products, Copyright 2008 Tyco Flow Control.

Boteler, Jack, et al., Thermal Expansion Compensators, Operations & Maintenance, "Save Pipes from Bursting with a Compensator", Reprinted from Chemical Engineering, Dec. 1999.

Product Data Sheet, Rosemount Manifolds, 00813-0100-4733, Rev NB, Emerson Process Management, Jan. 2011.

International Searching Authority, Search Report and Written Opinion, Jan. 21, 2015, 10 pages.

* cited by examiner

PRESSURE ISOLATION MANIFOLD

BACKGROUND

The present invention relates generally to isolation manifolds for use with industrial processes. In particular, this invention relates to isolation manifolds for use with pressure transmitters.

Pressure transmitters are used to monitor the pressure of process fluids used in industrial processes. A pressure transmitter includes a pressure sensor that produces an electrical output as a function of the pressure of a process fluid, such as water lines, chemical tanks or the like. Each pressure transmitter also includes transmitter electronics for receiving and processing the electrical output of the sensor so that the transmitter and process parameter can be monitored locally or remotely. Locally monitored transmitters include displays, such as LCD screens, that show the electrical output at the site of the process transmitter. Remotely monitored transmitters include electronics that transmit the electrical output over a wired control or monitoring loop or wireless network to a central monitoring location such as a control room. Configured as such, the process parameter can be regulated from the control room by including automated switches, valves, pumps and other similar components in the control loop.

Pressure transmitters may be connected to the process to be monitored by an isolation manifold. An isolation valve (or block valve) in the manifold can be closed to isolate the pressure transmitter from the process for service (e.g. calibration) or removal of the pressure transmitter. Isolation manifolds may also include a bleed port to relieve any pressure in the manifold prior to servicing or removing the pressure transmitter. Typically, the bleed port includes a bleed screw or a bleed valve operable to selectively open or seal the bleed port. Isolation manifolds including an isolation valve and a bleed port are also referred to as block and bleed manifolds.

SUMMARY

An embodiment of the present invention is an isolation manifold including a manifold body, a process connection at a first end of the manifold body, a pressure transmitter connection at a second end of the manifold body, a passageway through the manifold body, an isolation valve, and a pressure limiting device. The process connection is for fluidly connecting the isolation manifold to a process vessel or conduit containing a process fluid. The pressure transmitter connection is for fluidly connecting the isolation manifold to a pressure transmitter. The passageway fluidly connects the process connection to the pressure transmitter connection. The isolation valve is operable to selectively block the passageway to isolate the process connection from the pressure transmitter connection. The pressure limiting device fluidly connects to the passageway between the isolation valve and the pressure transmitter connection.

Another embodiment of the present invention is a pressure measurement system including a pressure transmitter and an isolation manifold. The isolation manifold fluidly connects the pressure transmitter to a process vessel or conduit containing a process fluid. The isolation manifold includes a manifold body, a process connection at a first end of the manifold body, a pressure transmitter connection at a second end of the manifold body, a passageway through the manifold body, an isolation valve, and a pressure limiting device. The process connection is for fluidly connecting the isolation manifold to the process vessel or conduit. The pressure transmitter connection is for fluidly connecting the isolation manifold to the pressure transmitter. The passageway fluidly connects the process connection to the pressure transmitter connection. The isolation valve is operable to selectively block the passageway to isolate the process connection from the pressure transmitter connection. The pressure limiting device fluidly connects to the passageway between the isolation valve and the pressure transmitter connection.

Yet another embodiment of the present invention is isolation manifold including a manifold body, a process connection at a first end of the manifold body, a pressure transmitter connection at a second end of the manifold body, a passageway through the manifold body, an isolation valve, a bleed port, and a pressure limiting device. The process connection is for fluidly connecting the isolation manifold to a process vessel or conduit containing a process fluid. The pressure transmitter connection is for fluidly connecting the isolation manifold to a pressure transmitter. The passageway fluidly connects the process connection to the pressure transmitter connection. The isolation valve is operable to selectively block the passageway to isolate the process connection from the pressure transmitter connection. The bleed port fluidly connects to the passageway between the isolation valve and the pressure transmitter connection. The pressure limiting device fluidly connects to the passageway between the isolation valve and the pressure transmitter connection.

DETAILED DESCRIPTION

Figure 1:
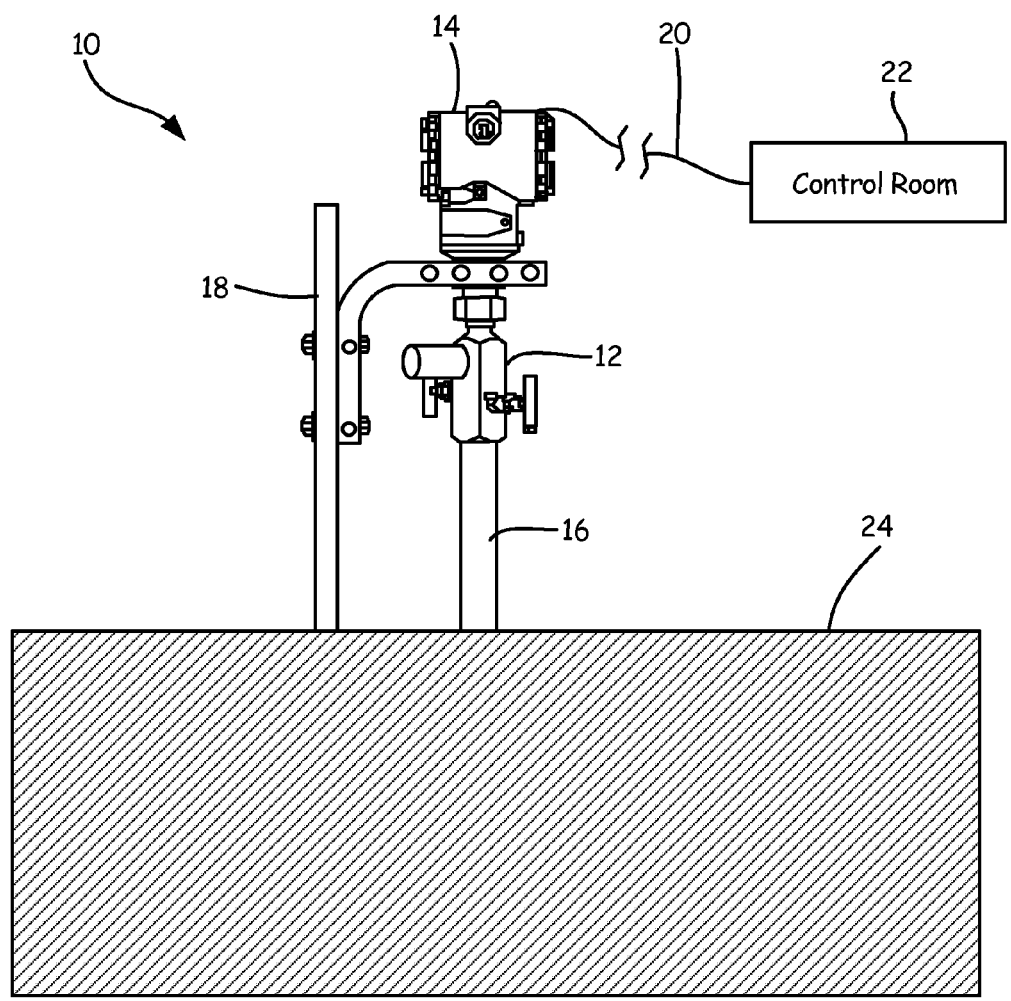
FIG. 1 is a schematic view of a process control or monitoring system in which an isolation manifold embodying the present invention is used.

Pressure transmitters are typically designed to withstand an overpressure far in excess of the operational range of the transmitter. For example, a pressure transmitter designed to measure pressure up to 150 psi may be able to withstand an overpressure condition of up to 1,500 psi without damage. Processes to be monitored are carefully designed and controlled such that exceeding the overpressure limit of a process transmitter should not happen. Nevertheless, process phenomena can develop that subject the pressure transmitter to pressures far exceeding the overpressure capability of the process transmitter. One phenomenon occurs when process fluid in contact with a process transmitter is sealed off or trapped, and then experiences a temperature change that increases the volume of the sealed process fluid. The volume change may be due to expansion of the process fluid as the temperature increases, or expansion as the process fluid solidifies as the temperature decreases (e.g. water freezing to ice). Such volume changes can result in a pressure increase exceeding the overpressure limit of the pressure transmitter. This may be particularly problematic for pressure transmitters connected to a process by an isolation manifold. Once the isolation valve is closed, should the isolation manifold experience a significant temperature change before being bled of process fluid, the trapped process fluid may expand and damage the pressure transmitter.

Embodiments of the present invention overcome the above problem with an isolation manifold that includes a pressure limiting device between an isolation valve and a pressure transmitter connection. The pressure limiting device limits the pressure in the isolation valve by automatically providing a volume into which the trapped process fluid can expand before the trapped process fluid exceeds an overpressure limit for an attached pressure transmitter. The pressure limiting device may be, for example, a volume expansion compensator or a pressure relief valve.

Another phenomenon that can subject a pressure transmitter to pressures exceeding the design of the process or the overpressure capability of the process transmitter is fluid hammer. This is a pressure impulse created by the sudden stopping or starting of a process fluid flow by, for example, quickly opening or closing a valve. Typically, the pressure impulse resulting from fluid hammer lasts for only a few milliseconds, but the magnitude of the pressure impulse may exceed the overpressure limit of an attached pressure transmitter. In addition, fluid hammer may also cause cavitation which can create damaging shock waves in the fluid.

Some embodiments of the present invention, in addition to addressing the trapped fluid problem, overcome the fluid hammer problem as well by including a pressure snubber within the isolation manifold. A pressure snubber increases the flow impedance through the isolation manifold, reducing the rate at which a pressure impulse can pass through the isolation manifold to the pressure transmitter, thus reducing the magnitude of the pressure impulse. A pressure snubber may be, for example, a porous filter media made of sintered metal or a nozzle having a small diameter hole for process fluid to pass through.

Isolation manifolds embodying the present invention are easy to install and use, and automatically provide overpressure protection for an attached pressure transmitter from a volume expansion of process fluid trapped within the isolation manifold. By including a pressure snubber, additional protection for the pressure transmitter from fluid hammer is also automatically provided.

FIG. 1 is schematic view of a process control or monitoring system in which an isolation manifold embodying the present invention is used. Process control or monitoring system 10 includes isolation manifold 12, pressure transmitter 14, impulse line 16, support 18, control or monitoring loop 20, control room 22, and process vessel 24. Although process vessel 24 is illustrated as a tank, it may also be any of a number of process vessels or conduits containing a process fluid, including: process piping, storage tank, heat exchanger, boiler, distillation column, kiln, or reactor. In this embodiment, isolator manifold 12 is fluidly connected to process vessel 24 by way of impulse line 16, and to pressure transmitter 14. Pressure transmitter 14 is held in position by support 18, which may be attached to process vessel 24, as illustrated. Control or monitoring loop 20 connects pressure transmitter 14 to control room 22. Pressure transmitter 14 includes a pressure sensor and transmitter circuitry for generating an electrical signal based on a sensed pressure of the process fluid. Pressure transmitter 14 also includes other electrical components for transmitting the electrical signal over control or monitoring loop 20 to control room 22 or a local display such as an LCD screen, or both. Isolator manifold 12 includes a pressure limiting device that limits the pressure in the isolation manifold by automatically providing a volume into which the trapped process fluid can expand, as discussed with reference to FIG. 2.

In one embodiment, pressure transmitter 14 is a two-wire transmitter for operating on a 4-20 mA loop. In such an embodiment, control or monitoring loop 20 includes a pair of wires for supplying power to pressure transmitter 14 from control room 22. Control or monitoring loop 20 also enables control room 22 to transmit data to and receive data from pressure transmitter 14. Communication over control or monitoring loop 20 can be in the form of an analog current level which varies between 4 and 20 mA, a HART® communication protocol in which digital information is modulated upon a 4-20 mA current, or a Fieldbus or Profibus communication protocol over a digital bus. In other embodiments, pressure transmitter 14 communicates with control room 22 over a wireless network using a wireless protocol such as, for example, WirelessHART (IEC 62951).

Figure 2:
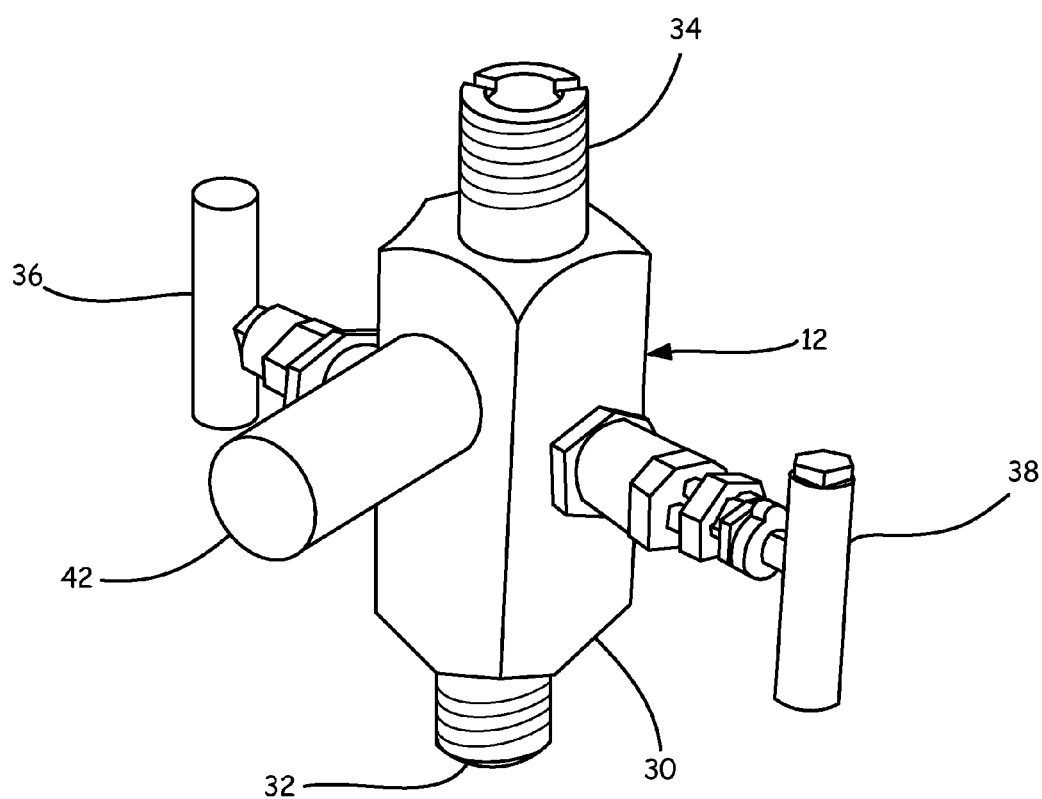
FIG. 2 is a perspective view of an isolation manifold illustrating an embodiment of the present invention.
Figure 3:
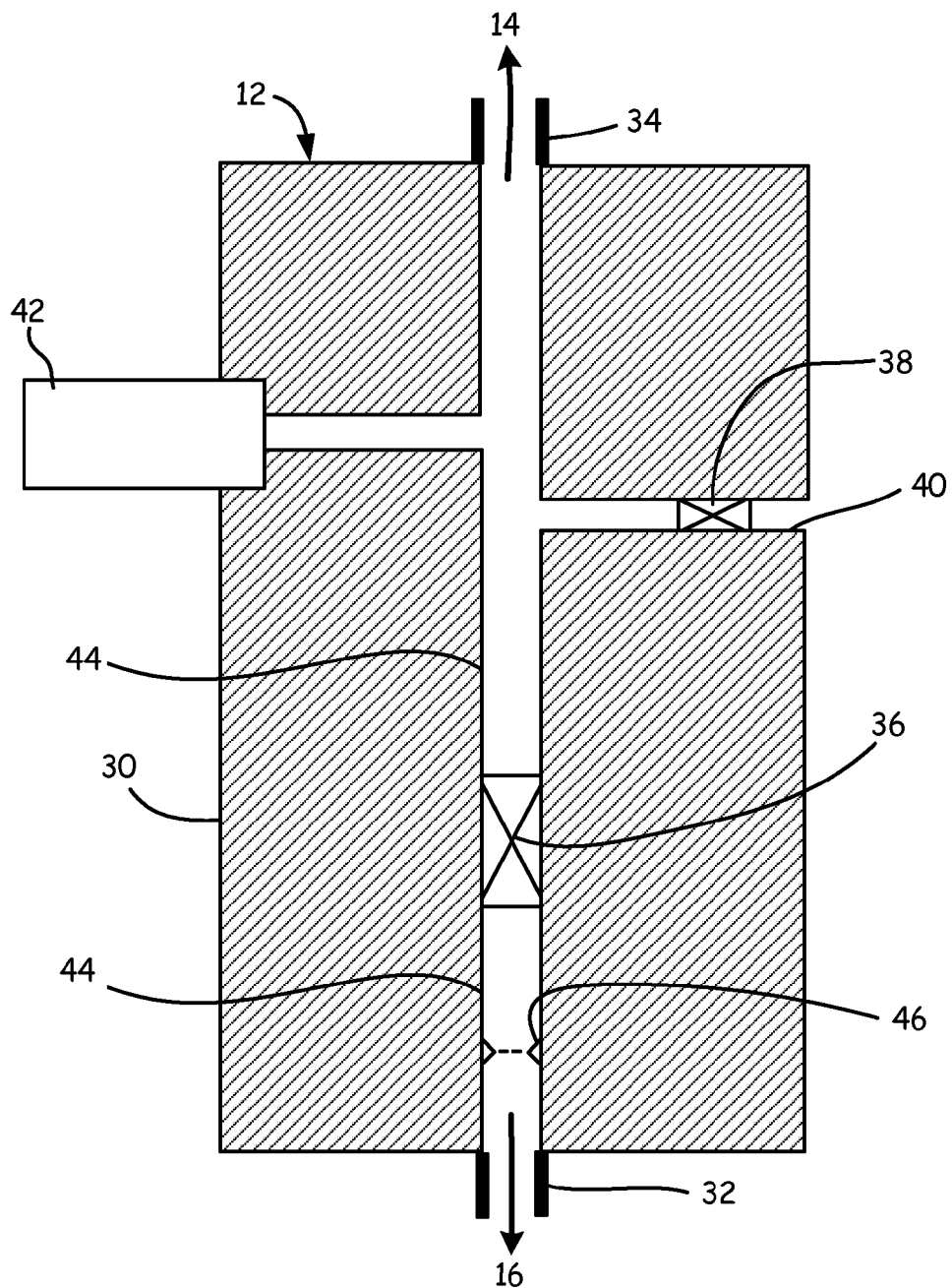
FIG. 3 is a schematic view of the isolation manifold shown in FIG. 2.

FIG. 2 is a perspective view of isolation manifold 12 illustrating on embodiment of the present invention. Isolation manifold 12 includes manifold body 30, process connection 32, pressure transmitter connection 34, isolation valve 36, bleed valve 38, and pressure limiting device 42. FIG. 3 is a schematic view of the isolation manifold shown in FIG. 2. As shown in FIG. 3, isolation manifold 12 further includes bleed port 40 and passageway 44.

Considering FIGS. 2 and 3 together, process connection 32 is at a first end of manifold body 30, pressure transmitter connection 34 is at a second end of manifold body 30, and passageway 44 fluidly connects process connection 32 to pressure transmitter connection 34. According to this embodiment, isolation valve 36 may be operated to selectively block passageway 44 to isolate pressure transmitter connection 34 from process connection 32. Pressure limiting device 42 is fluidly connected to passageway 44 between isolation valve 36 and pressure transmitter connection 34. Bleed port 40 is fluidly connected to passageway 44 between isolation valve 36 and pressure transmitter connection 34. Bleed valve 38 is fluidly connected to bleed port 40 and may be operated to selectively open bleed port 40.

Considering FIGS. 1, 2, and 3 together, in operation, bleed valve 38 is operated to close bleed port 40. Isolation valve 36 is operated to open passageway 44, so that pressure transmitter 14 senses a process pressure of process vessel 24 by way of impulse line 16 and passageway 44 in isolation manifold 12. Pressure limiting device 42 is fluidly connected to passageway 44, but does not typically activate during normal operation because the process pressure of process vessel 24 is typically controlled such that it is well below an overpressure limit for pressure transmitter 14.

When it is desired to take pressure transmitter 14 is out of service, isolation valve 36 is operated to block passageway 44. This isolates process connection 32 from process transmitter connection 34, thus isolating pressure transmitter 14 from impulse line 16 and process vessel 24. Process fluid pressure within passageway 44 may be relieved by operating bleed valve 38 to open bleed port 40.

In some instances, process fluid may become trapped within passageway 44 because, for example, bleed valve 38 is inadvertently not operated to open bleed port 40, or bleed port 40 includes a plug (not shown) that is inadvertently not removed. Process fluid thus trapped within passageway 44 may increase in volume due to, for example, a temperature change, resulting in an increase in the pressure of the trapped process fluid. As the pressure increases beyond the operating range of pressure transmitter 14, but before reaching the overpressure limit of pressure transmitter 14, pressure limiting device 42 automatically operates to prevent a further increase in the trapped process fluid pressure. Pressure limiting device 42 limits the pressure in isolation valve by automatically providing a volume into which the trapped process fluid can expand before the trapped process fluid exceeds the overpressure limit for pressure transmitter 14.

Pressure limiting device 42 may be, for example, a volume expansion compensator which provides a contained volume into which the trapped process fluid may expand against a known pressure. A volume expansion compensator is essentially a pressure containment structure containing within a flexible membrane that separates the process fluid from a volume of pressurized inert gas. By adjusting, or charging, the inert gas volume to a desired pressure, the volume expansion compensator is able to accommodate an increasing volume of process fluid as the process fluid pressure increases above a desired level. The flexible membrane is selected such that is it non-reactive with the process fluid and able to remain flexible over an anticipated range of temperatures. Such devices are commercially available and may also be referred to as thermal expansion compensators.

Alternatively, pressure limiting device 42 may be a pressure relief valve and the trapped process fluid may expand into an uncontained volume ambient to isolation manifold 12, or into a contained volume attached to the outflow of the pressure relief valve. In any case, pressure limiting device 42 is calibrated to automatically provide pressure relief before the overpressure limit of pressure transmitter 14 is reached, thus protecting pressure transmitter 14 from damage due to the expansion of process fluid trapped within isolation manifold 12.

As noted above, in addition to the trapped process fluid problem, another phenomenon that can subject pressure transmitter 14 to pressures exceeding the overpressure capability of process transmitter 14 is fluid hammer. Pressure limiting device 42 may also provide some protection of process transmitter 14 from fluid hammer by absorbing some effect of a damaging pressure impulse. However, the pressure impulse resulting from fluid hammer lasts for only a few milliseconds and the automatic operation of pressure limiting device 42 may not be able to fully react in such a short period of time.

The embodiment of FIG. 3 further protects process transmitter 14 by including pressure snubber 46 to reduce the damaging effects of fluid hammer. As shown in FIG. 3, isolation manifold 12 preferably includes pressure snubber 46 within passageway 44. Pressure snubber 46 increases flow impedance through isolation manifold 12, reducing the rate at which a pressure impulse can pass through passageway 44 and the magnitude of the pressure impulse. Pressure snubber 46 increases the flow impedance through passageway 44, reducing the rate at which a pressure impulse can pass through isolation manifold 12 to pressure transmitter 14, thus reducing the magnitude of the pressure impulse. Pressure snubber 46 may be, for example, a porous filter media made of sintered metal or a nozzle that restricts process fluid flow to an orifice having a diameter smaller than passageway 44.

As shown in FIG. 3, pressure snubber 46 is disposed in a portion of passageway 44 between process connection 32 and isolation valve 36. While this location facilitates assembly of isolation manifold 12 to include pressure snubber 46, it is understood that embodiments of the present invention include those having pressure snubber 46 anywhere within passageway 44, provided that pressure snubber 46 increases flow impedance between process connection 32 and pressure transmitter connection 34.

Although the embodiments described above are illustrated for an isolation manifold for use with an inline pressure transmitter, it will be understood by those skilled in the art that the present invention encompasses embodiments of isolation manifolds for use with differential pressure transmitters. In addition, although embodiments above are shown with a bleed valve (sometimes referred to as a two-valve configuration), it is understood that the invention encompasses embodiments including a bleed screw instead of a bleed valve (sometimes referred to as a block-and-bleed configuration).

Embodiments of the present invention overcome the problem of damage to a pressure transmitter due to expansion of a trapped volume within an attached isolation manifold by including a pressure limiting device in the isolation manifold between an isolation valve and the pressure transmitter. The pressure limiting device limits the pressure in the isolation valve by automatically providing a volume into which the trapped process fluid can expand before the trapped process fluid exceeds an overpressure limit for the attached pressure transmitter. Isolation manifolds embodying the present invention are easy to install and use, thus no additional training or action is required to provide automatic protection from damage due to trapped process fluid.

Some embodiments of the present invention also prevent damage to the process transmitter due to fluid hammer by including a pressure snubber within the isolation manifold. A pressure snubber increases the flow impedance through the isolation manifold, reducing the rate at which a pressure impulse can pass through the isolation manifold to the pressure transmitter, thus reducing the magnitude of the pressure impulse.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An isolation manifold comprising:
   a manifold body;
   a process connection at a first end of the manifold body for fluidly connecting the isolation manifold to a process vessel or conduit containing a process fluid;
   a pressure transmitter connection at a second end of the manifold body for fluidly connecting the isolation manifold to a pressure transmitter;
   a passageway through the manifold body fluidly connecting the process connection to the pressure transmitter connection;
   an isolation valve operable to selectively block the passageway to isolate the process connection from the pressure transmitter connection; and
   a pressure limiting device fluidly connected to the passageway between the isolation valve and the pressure transmitter connection.

2. The manifold of claim 1, further comprising:
   a pressure snubber within the passageway to increase a flow impedance of the passageway.

3. The manifold of claim 2, wherein the pressure snubber includes a porous filter media made of sintered metal.

4. The manifold of claim 2, wherein the pressure snubber includes a nozzle that restricts process fluid flow to an orifice having a diameter smaller than the passageway.

5. The manifold of claim 1, further comprising:
   a bleed port fluidly connected to the passageway between the isolation valve and the pressure transmitter connection.

6. The manifold of claim 5, further comprising:
a bleed screw fluidly connected to the bleed port and operable to selectively open the bleed port.

7. The manifold of claim 5, further comprising:
a bleed valve fluidly connected to the bleed port and operable to selectively open the bleed port.

8. The manifold of claim 1, wherein the pressure limiting device is a volume expansion compensator.

9. The manifold of claim 1, wherein the pressure limiting device is a pressure relief valve.

10. A pressure measurement system comprising:
a pressure transmitter; and
an isolation manifold fluidly connecting the pressure transmitter to a process vessel or conduit containing a process fluid, the manifold including:
a manifold body;
a process connection at a first end of the manifold body for fluidly connecting the isolation manifold to the process vessel or conduit;
a pressure transmitter connection at a second end of the manifold body for fluidly connecting the isolation manifold to the pressure transmitter;
a passageway through the manifold body fluidly connecting the process connection to the pressure transmitter connection;
an isolation valve operable to selectively block the passageway to isolate the process connection from the pressure transmitter connection; and
a pressure limiting device fluidly connected to the passageway between the isolation valve and the pressure transmitter connection.

11. The system of claim 10, wherein the manifold further includes:
a pressure snubber within the passageway to increase a flow impedance of the passageway.

12. The system of claim 10, wherein the manifold further includes:
a bleed port fluidly connected to the passageway between the isolation valve and the pressure transmitter connection.

13. The system of claim 12, wherein the manifold further includes:
a bleed screw fluidly connected to the bleed port and operable to selectively open the bleed port.

14. The system of claim 12, wherein the manifold further includes:
a bleed valve fluidly connected to the bleed port and operable to selectively open the bleed port.

15. The system of claim 10, wherein the pressure limiting device is a volume expansion compensator.

16. The system of claim 10, wherein the pressure limiting device is a pressure relief valve.

17. An isolation manifold comprising:
a manifold body;
a process connection at a first end of the manifold body for fluidly connecting the isolation manifold to a process vessel or conduit containing a process fluid;
a pressure transmitter connection at a second end of the manifold body for fluidly connecting the isolation manifold to a pressure transmitter;
a passageway through the manifold body fluidly connecting the process connection to the pressure transmitter connection;
an isolation valve operable to selectively block the passageway to isolate the process connection from the pressure transmitter connection;
a bleed port fluidly connected to the passageway between the isolation valve and the pressure transmitter connection; and
a pressure limiting device fluidly connected to the passageway between the isolation valve and the pressure transmitter connection.

18. The manifold of claim 17, further comprising:
a pressure snubber within the passageway to increase a flow impedance of the passageway.

19. The manifold of claim 17, further comprising at least one of:
a bleed screw fluidly connected to the bleed port and operable to selectively open the bleed port; and
a bleed valve fluidly connected to the bleed port and operable to selectively open the bleed port.

20. The manifold of claim 17, wherein the pressure limiting device is at least one of a volume expansion compensator and a pressure relief valve.

* * * * *